3,322,701
PROCESS FOR IMPROVING FOAMED POLY-
URETHANE PLASTICS BY TREATING WITH
AN ALKALI SOLUTION OF A WATER FREE
ALIPHATIC MONOHYDRIC ALCOHOL
Johann Bauer, Essen, and Aloys Zenz, Essen, Steele, Germany, assignors to Johann Bauer, Essen, Germany and Bernard Reisgies, Essen, Germany
No Drawing. Filed May 4, 1964, Ser. No. 364,823
4 Claims. (Cl. 260—2.5)

The present invention relates to a process for treating foamed polyurethane plastics in order to improve the properties of the same.

It has been proposed already to treat foamed polyurethane plastics prepared in known manners according to the diisocyanate poly-addition process, with alkaline or acidic means capable to hydrolyse ester and/or urethane groups in such a way that a decrease in weight ranging between about 10 and about 50% of the original weight is obtained, the foamed products at the same time being subjected to a mechanical treatment by fulling, wringing out or repeated pressing. It has furthermore already been proposed to add to the above mentioned aqueous treating solutions organic solvents miscible with water such as acetone. Such after-treatment of foamed polyurethane plastics is desirable in order to improve certain properties of said products such as the feel.

It is an object of the present invention to provide an improved process for treating foamed polyurethane plastics in order to improve the properties of the same. Further objects of the present invention and advantages thereof will become apparent as the description proceeds.

It has been found that the after-treatment of foamed polyurethane plastics may be performed with surprising and new effects in such a way that the foamed plastics are treated with solutions of alkalis in a water-free solvent, preferably of sodium or potassium hydroxide in water-free lower aliphatic monohydric alcohols, preferably in methyl, ethyl or isopropyl alcohol or mixtures thereof, until a decrease in weight ranging between about 10% and about 70% of the original weight has been achieved.

While in the known processes elevated temperatures have to be applied in order to achieve the desired improvement in property within a short period of treatment, the process according to the present invention results in the desired effects at room temperature already and this within a shorter period of time. Furthermore, alkaline solutions of lower concentrations may be used. For example, in the known processes a temperature of 70–80° C. is necessary in order to perform the after-treatment within 5–10 minutes using a 10% aqueous sodium hydroxide solution. When working in accordance with the present invention, the same results are obtained within a period of treatment of about 15 to 30 seconds and at room temperature using a 5% solution of for instance potassium hydroxide in dry methanol, ethanol, propanol, isopropanol or butyl alcohol or mixtures thereof. The foam plastics thus treated remains soft and of good feed and hand. The following Table I illustrates the preferred periods of treatment for different foamed polyurethane plastics using 3% potassium hydroxide solutions in different lower aliphatic alcohols.

TABLE I

| Alcohol | Foam plastics | Period of treatment, sec. |
| --- | --- | --- |
| Methyl alcohol | Fine-pore foam, weight: 40 to 60 kg./cb.m. | 20 to 40 |
| Ethyl alcohol | Fine-pore foam, weight: 18 to 46 kg./cb.m. | 10 to 20 |
| Do | Silicone foam | 50 |
| Propyl alcohol | Fine-pore foam, weight: 18 to 46 kg./cb.m. | 15 |
| Do | ----do---- | 20 |
| Butyl alcohol | ----do---- | 30 |
| Do | Silicone foam | 120 |

Furthermore, foamed polyurethane plastics may be treated according to the present invention which by the known processes cannot at all be modified and improved or may only very difficultly be improved. For instance, a polyurethane VL–100 foam prepared in the presence of silicone oil may be modified and opened when using a 5 to 15% sodium hydroxide solution in methanol at room temperature within about 2 to 3 minutes while when working in an aqueous medium strong acids have to be used in order to obtain a modification and opening of the pores of such starting materials. Also polyether foams, i.e. polyurethanes in the production of which ether groups containing bivalent or polyvalent alcohols have been used, may be improved by the process of the present invention with good results.

The same is true also with foamed NCO-modified polyester plastics, i.e. foam plastics produced with Desmophen VL–100, i.e. a prepolymer prepared by reacting a linear polyester with an excess of a mixture of toluylene-2,6-diisocyanate and toluylene-2,4-diisocyanate, said product representing a brownish viscous liquid having an isocyanate content of 9.5 to 10.5% and a density of about 1.24 g./ccm. (see Bayer-Kunststoffe 1955, page 68), which may be developed and improved to the desired properties only with bad results in an aqueous medium.

The process according to the present invention shows the further result that the activating agents used during the preparation of the foamed polyurethane plastics are dissolved therefrom. The remaining amounts of activating agent present in the foam plastics known up-to-now produce an aging of the foam plastics to an undesirable extent. By dissolving these remaining amounts of activating agents the foam plastics are rendered more resistant to aging.

The present invention is based on the fact that the lower aliphatic alcohols used for the production of the treating solutions possess a larger capability of wetting the foamed plastics than water and that therefore the treating solutions according to the present invention may protrude the foamed plastics more uniformly and quicker than the aqueous treating solutions used up to now.

The treating solutions used according to the present invention may vary considerably with respect to their content of sodium and/or potassium hydroxide. Preferably, treating solutions are used which contain about 5 to 30% of the alkali metal hydroxide. The process of the present invention may be carried out also at an elevated temperature. However, this does not produce a technical advance over the working at room temperature as the treating times at room temperature are already sufficiently short, i.e. are in range of about 0.26 and 6 minutes, depending upon the nature of the foamed plastics material to be treated.

The following Table II shows the concentrations of the treating solutions and the treating times as well as the nature of the treated foam plastics. The periods of treatment given in this table refer to a temperature of 18° C.

thoroughly washed with water. The thus obtained foamed product has a well preserved skelton while the cellular walls of the pores have been removed; its elasticity and tensile strength is unchanged in comparison with the starting material. The modified improved foamed plastics product may be used for the production of a carrier material

TABLE II

| Foamed plastics material to be treated and weight (kg./cb.m.) at a plate-thickness of 1-3 cm. | Time of treatment in min. | Potassium hydroxide dissolved in methyl alcohol, percent | Sodium hydroxide dissolved in methyl alcohol, percent | Sodium hydroxide dissolved in ethyl alcohol, percent |
|---|---|---|---|---|
| Foamed polyurethane plastics | 0.5 | 30–15 | 30–15 | 40 |
| 20 kg./cb.m. | 1 | 15–5 | 15–5 | 20 |
| 23 kg./cb.m. | 1 | 15–5 | 15–5 | 20 |
| 28 kg./cb.m. | 1 | 15–5 | 15–5 | 20 |
| 38 kg./cb.m. | 1 | 15–5 | 15–5 | 20 |
| Above 40 kg./cb.m. | 0.25 | 30–15 | 30–15 | 40 |
| Do | 0.50 | 10–5 | 15–5 | 20 |
| Foamed materials weighing 40–60 kg./cb.m. | 0.50 | 30–15 | 30–15 | 40 |
|  | 1 | 10–5 | 10–5 | 20 |
| With silicone prepared foams; weight: 40 kg./cb.m. | 2 | 30–15 | 30–15 |  |
|  | 3 | 15–5 | 15–5 |  |
| With silicone prepared foams; especially rigid. | 4 | 30 | 30 |  |
|  | 6 | 15 | 15 |  |

The treatment according to the present invention is carried out in such a way that a decrease in weight in the range of about 10 to about 70% is obtained. The ultimate tensile strength, the elasticity, and the extensibility of the foamed plastics treated according to the invention in general are not worse and are partly improved over those of the untreated foamed plastics.

After the treatment according to the invention has been performed the foamed plastics has to be neutralized which is achieved in manners known per se. Diluted aqueous acids such as acetic acid, phosphoric acid or formic acid may be used for neutralization. The resulting foamed plastics are soft, permeable to air and light in weight. They may be used for various purposes, for instance, as filters, for heat insulation purposes or in the textile industry.

The following examples serve to illustrate the process of the present invention without however limiting the same thereto.

*Example I*

A 1 cm. thick plate of a fine-pore foamed normal polyester polyurethane plastics having a weight of about 20–22 kg. is dipped for 1 minute in a solution of 300 g. of potassium hydroxide in 1000 ml. of dry methyl alcohol; it is then taken out of the bath, pressed and neutralized in a 10% aqueous acetic acid bath. Finally, the foamed material is thoroughly washed with water. The resulting fine-pore foamed plastics show a definitely visible change in structure in comparison with the starting material; it has a soft, vivid structure and has open pores. While the skeleton of the foamed plastics is well preserved the cellular walls of the pores have been substantially removed. Because of its permeability to air the thus obtained foamed material may be used very well for packing synthetic fabrics as well as filters and/or as heat insulation material. Because of its imbibition power the thus obtained foamed products may also be further processed to sponges of any kind.

*Example II*

A 5 cm. thick plate of a fine-pore foamed plastics prepared with the aid of an NCO-modified polyester is treated at room temperature with a solution prepared from 300 g. of potassium hydroxide and 1000 g. of anhydrous methyl alcohol. The plate is dipped into the bath for 2 minutes, then taken from the bath and pressed and neutralized in a 10% acetic acid bath. Finally, the foamed plastic is thoroughly washed with water. The thus obtained foamed product has a well preserved skelton while the cellular walls of the pores have been removed; its elasticity and tensile strength is unchanged in comparison with the starting material. The modified improved foamed plastics product may be used for the production of a carrier material for construction materials, as insulation means, as macro-filter, as well as for sound insulation purposes.

*Example III*

The foamed plastics product mentioned in Example I is treated at a temperature of 0° C. with a solution of 10 g. of sodium hydroxide in 1000 g. of anhydrous methyl alcohol. The time of treatment is one hour. The foam is then taken from the bath, wrung out and neutralized in a 50% phosphoric acid bath. Finally, the foamed material is thoroughly washed with water.

*Example IV*

An after-treatment bath is prepared by dissolving 39 g. of potassium hydroxide in 780 g. of isopropyl alcohol. The solution is filtered to remove undissolved residues. Ether groups containing foamed polyurethane plastics products (polyurethanes prepared from, e.g. diisocyanates and ether groups containing di- or polyvalent alcohols or mixtures thereof) having a weight of 20 to 30 kg./cb.m. and having a plate thickness of 20 to 30 mm. are dipped into the bath for a period of 10 to 180 sec. depending upon the weight and plate thickness of the foamed plastics products. The thus treated polyether polyurethane products are pressed and passed through a 5% aqueous acetic acid neutralization bath for a period of a couple of seconds. The thus obtained foam plastics products are as rigid and as elastic as the untreated products and are completely permeable to air.

What we claim is:

1. A process for improving foamed polyurethane plastics, comprising subjecting a foamed polyurethane plastic product to the action of a solution of an alkali in a water-free lower aliphatic monohydric alcohol until a decrease in weight ranging from about 10% to about 70% of the original weight of the foamed plastics product is achieved and subjecting the thus obtained foamed plastics product to the action of a neutralization bath until neutralization is completed.

2. A process as claimed in claim 1 wherein neutralization is effected in a diluted aqueous acid selected from the group consisting of acetic acid and phosphoric acid.

3. A process as claimed in claim 1 wherein the alkali is a member selected from the group consisting of sodium hydroxide and potassium hydroxide.

4. A process as claimed in claim 1 wherein the lower aliphatic monohydric alcohol is a member selected from the group consisting of methanol, ethanol, propanol, isopropanol and butanol and the mixtures thereof.

References Cited

UNITED STATES PATENTS 3,125,541  3/1964  Hwa et al. _____ 260—2.5

FOREIGN PATENTS 789,481  1/1958  Great Britain.

DONALD E. CZAJA, *Primary Examiner.*
LEON J. BERCOVITZ, *Examiner.*
G. W. RAUCHFUSS, *Assistant Examiner.*